United States Patent [19]
Tadokoro et al.

[11] 4,235,843
[45] Nov. 25, 1980

[54] CATALYTIC CONVERTER

[75] Inventors: Tomoo Tadokoro; Haruo Okimoto; Shinichi Yoshii, all of Hiroshima, Japan

[73] Assignee: Toyo Kogyo Co., Ltd., Hiroshima, Japan

[21] Appl. No.: 65,744

[22] Filed: Aug. 10, 1979

[30] Foreign Application Priority Data

Aug. 14, 1978 [JP] Japan .................................. 53-99399
Aug. 25, 1978 [JP] Japan .................................. 53-104108
Aug. 29, 1978 [JP] Japan .................................. 53-105804
Sep. 12, 1978 [JP] Japan .................................. 53-112691

[51] Int. Cl.$^3$ .............................................. F01N 3/28
[52] U.S. Cl. ..................................... 422/119; 60/299; 422/171; 422/172
[58] Field of Search ............................... 422/170–172, 422/119; 60/299, 307; 55/DIG. 30

[56] References Cited

U.S. PATENT DOCUMENTS

| | | |
|---|---|---|
| 3,740,197 | 5/1971 | Scheitlin et al. .................. 422/172 X |
| 3,771,969 | 11/1973 | Scheitlin .......................... 422/176 X |
| 3,852,041 | 12/1974 | Moore et al. ......................... 422/176 |
| 3,927,984 | 12/1975 | Hartley ............................. 60/299 X |

*Primary Examiner*—William A. Cuchlinski, Jr.
*Attorney, Agent, or Firm*—Wenderoth, Lind & Ponack

[57] ABSTRACT

A catalytic converter for removing noxious pollutants from exhaust gases particularly emitted from an automobile internal combustion engine comprises a housing having a pair of longitudinally spaced catalyst containers mounted therein between inlet and outlet. The housing is constituted by a top housing shell and a bottom housing shell positioned one above the other with respective flanges of the top and bottom housing shells joined together. Each of the catalyst containers is similarly constituted by an upper retainer plate and a lower retainer plate positioned one above the other with respective flanges of the upper and lower retainer plates joined together. The overlapped flanges of the upper and lower retainer plates for each catalyst container are sandwiched between the flanges of the top and bottom housing. A secondary air supply pipe is supported by the housing and projects into the intermediate chamber between the catalyst containers within the housing through the joint of the top and bottom housing shells.

8 Claims, 10 Drawing Figures

CATALYTIC CONVERTER

BACKGROUND OF THE INVENTION

The present invention generally relates to a catalytic converter for automobile use and, more particularly, to a catalytic converter having series-disposed two beds of catalyst material.

The U.S. Pat. No. 3,852,041, patented on Dec. 3, 1974, discloses a low profile catalytic converter which comprises substantially identical top and bottom housing plates and substantially identical top and bottom catalyst retaining plates sandwiched therebetween so as to define an inclined catalyst containing space of substantially uniform depth spaced inwardly at varying distances of the housing plates. The four plates have mating peripheral faces conterminous over substantially their entire peripheries adapted for edge-sealing and, further, define in combination peripherally spaced cylindrical contours adapted to receive exhaust inlet and outlet pipes. One of the contours is defined by a semicylindrical downwardly concave portion in the top housing plate, like-positioned downwardly concave portions in both retaining plates and an upwardly concave portion in the bottom housing plate while the other of the contours is similarly defined by the housing plates but with upwardly concave portions in both retaining plates. The use of a plurality of support studs is disclosed, which extend between the housing plates across the catalyst containing space to provide a converter having high structural integrity and increased resistance to deformation.

The U.S. Pat. No. 3,771,969, patented on Nov. 13, 1973, discloses a catalytic converter having a pair of catalyst containers arranged in longitudinally spaced relation to each other within a housing structure and between exhaust gas inlet and outlet. When taken in a direction parallel to the longitudinal axis of the housing structure, each of the catalyst containers employed in the second mentioned U.S. patent is of a generally rectangular cross section and, correspondingly, the housing structure for these catalyst containers is of a generally rectangular cross section when taken in a direction longitudinally thereof.

In particular, the catalytic converter of the construction disclosed in the second mentioned U.S. patent requires a relatively complicated fabricating procedure and, in particular, a boring technique is required to form a bearing hole through which a secondary air supply pipe is supported and projects into an intermediate chamber defined within the housing structure between the catalyst containers.

SUMMARY OF THE INVENTION

Accordingly, the present invention has for its essential object to provide an improved catalytic converter having a pair of longitudinally spaced catalyst containers, which can readily and easily be assembled with a minimum number of component parts.

Another important object of the present invention is to provide an improved catalytic converter of the type referred to above which, because of the employment of the minimum number of the component parts, can be manufactured at relatively inexpensive cost.

A further object of the present invention is to provide an improved catalytic converter of the type referred to above which is characterized in its construction by the use of six sheet metal members so organized and arranged that edge seals only serve to define both of the catalyst container and the exhaust gas flow passages within the housing structure.

According to the present invention, the housing structure containing therein the longitudinally spaced first and second catalyst container is comprised of a generally upwardly dished top housing shell and a generally downwardly dished bottom housing shell positioned one above the other, with peripheral flanges of the respective housing shells sealingly joined together, to define a gas flow compartment. Within the gas flow compartment, there are disposed first and second catalyst containers arranged in a spaced row parallel to and, preferably, in axial alignment with the longitudinal axis of the housing structure between inlet and outlet defined respectively at the opposed ends of the housing structure. Each of these first and second catalyst containers identical in construction with each other includes an upper retainer plate and a lower retainer plate placed one above the other with flanges of respective upper and lower retainer plates joined together to define the corresponding catalyst space for the accommodation of a bed of catalyst material.

The catalytic converter according to the present invention further comprises a secondary air supply pipe projecting into an intermediate chamber between the first and second catalyst containers within the gas flow compartment for injecting a fresh secondary air, said secondary air supply pipe extending through a portion of the flanged joint between the top and bottom housing shells. For this purpose, at least one of the top and bottom housing shell has its peripheral flange which is partially concaved to provide a recess of a cross sectional shape complemental to the cross-sectional shape of the secondary air supply pipe.

According to the present invention, the catalytic converter is manufactured by the use of at least six sheet metal members, two for the top and bottom housing plate, two for each catalyst container, which are so organized and arranged that edge seals only serve to define the first and second catalyst containers and the exhaust gas flow passages within the housing structure.

The catalyst containers may contain respective beds of the same or different catalyst materials. Where the different catalyst materials are employed, a reducing catalyst material operable in the reducing atmosphere to remove pollutants of a reducible group contained in the automobile exhaust gases and an oxidizing catalyst material operable in the oxidizing atmosphere to remove pollutants of an oxidizable group contained in the same automobile exhaust gas are to be respectively filled in the first and second catalyst containers. The use of the three-way catalyst material selective for both of the reducible and oxidizable groups of pollutant is also possible. In any event, any of the catalyst materials known to those skilled in the art and currently commercially available may be used in the catalytic converter.

BRIEF DESCRIPTION OF THE DRAWINGS

These and other objects and features of the present invention will become apparent from the following description taken in conjunction with a preferred embodiment of the present invention with reference to the accompanying drawings, in which.

DETAILED DESCRIPTION OF THE INVENTION

Figure 1:
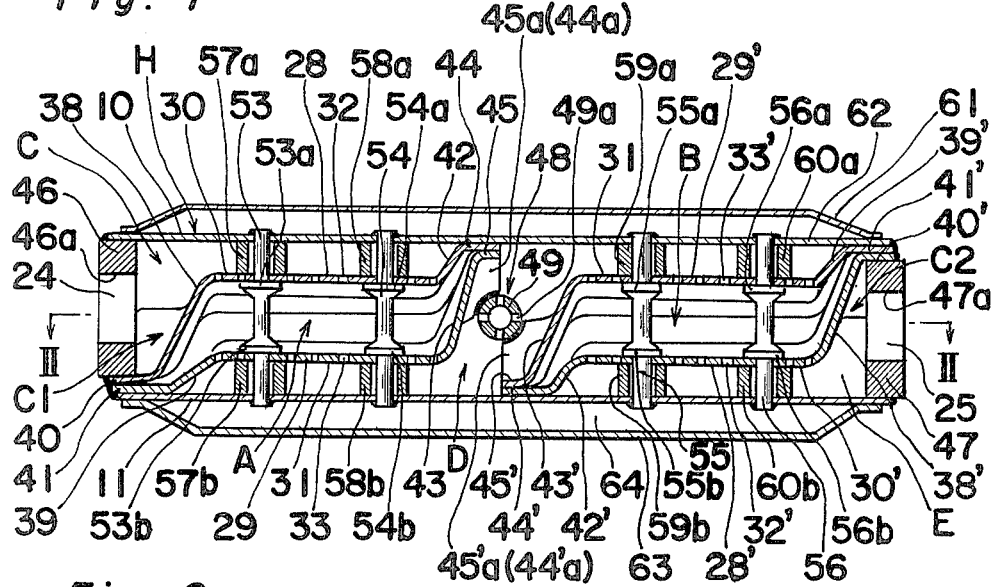
FIG. 1 is a longitudinal side sectional view of a catalytic converter embodying the present invention.

Before the description of the present invention proceeds, it is to be noted that like parts are designated by like reference numerals throughout the accompanying drawings.

Referring to FIGS. 1 to 5, a catalytic converter embodying the present invention comprises an elongated, generally flattened housing H made preferably of a metallic material having a sufficient resistance to the corrosive attack of high temperature salts and gases. The converter housing H is comprised of a top housing shell 10 and a bottom housing shell 11 which include generally vertically extending side walls 12 and 13, respectively, with peripheral flanges 14 and 15, respectively, extending therefrom substantially about their entire peripheries, said top and bottom housing shells 10 and 11 being combined together with the peripheral flanges 14 and 15 abutting in face-to-face relation to each other in a manner as will be described later.

The opposed portions of the flange 14, and the corresponding portions of the side wall 12, of the top housing shell 10 which correspond in position to the respective opposed ends of the converter are concaved to provide substantially semicylindrical passages 16 and 18. In addition, the opposed portions of the flange 14 of the top housing shell 10 which are located intermediate the length of the converter are also concaved to provide substantially semicylindrical recesses 20 and 22. Similarly, the opposed portions of the flange 15, and the corresponding portions of the side wall 13, of the bottom housing shell 11 which correspond in position to the respective opposed ends of the converter are concaved to provide substantially semicylindrical passages 17 and 19 and the opposed portions of the flange 13 of the bottom housing shell 11 which are located intermediate the length of the converter are also concaved to provide substantially semicylindrical recesses 21 and 23.

While the top and bottom housing shells 10 and 11 are individually constructed as hereinbefore described, when the top and bottom housing shells 10 and 11 are combined together in the manner described above and detailed hereinafter, these semicylindrical passages 16 and 18 in the top housing shell 10 cooperate respectively with the semicylindrical passages 17 and 19 in the bottom housing shell 11 to define an exhaust gas inlet 24 and an exhaust gas outlet 25, respectively, which are coaxial with each other and also with the longitudinal axis of the housing H, whereas the semicylindrical recesses 20 and 22 in the top housing shell 10 cooperate respectively with the semicylindrical recesses 21 and 23 in the bottom housing shell 11 to define first and second bearing holes 26 and 27, respectively.

Mounted within the housing H is first and second catalyst containers C1 and C2 of substantially identical construction which are respectively positioned adjacent the exhaust gas inlet 24 and the exhaust gas outlet 25 and are so arranged as to assume a symmetrical relation to each other with respect to the center of symmetry lying on the imaginary line drawn in the widthwise direction of the housing H in coaxial relation with any one of the first and second bearing holes 26 and 27, as can be understood from FIG. 1. These catalyst containers C1 and C2 may contain therein the same or different catalysts substantially tightly packed therein to provide respective catalyst beds which are not illustrated in the accompanying drawings for the sake of brevity.

Each of the first and second catalyst containers C1 and C2 is constructed as will now be described. However, it is to be noted that, since the first and second catalyst containers C1 and C2 are of identical construction, only one of which, for example, the catalyst container C1, will be described in details and the component parts of the second catalyst container C2 which correspond to the respective component parts of the first catalyst container C1 are shown by like reference numerals each having a prime.

The first catalyst container C1 is comprised of first and second retainer plates 28 and 29 of substantially identical construction but one positioned in reverse relation to the other. The first retainer plate 28 includes a perforated or louvered, generally flat portion 30 having a plurality of apertures 32 defined therein and extending completely through the thickness of the flat portion 30. Similarly, the second retainer plate 29 includes a perforated or louvered, generally flat portion 31 having a plurality of apertures 33 defined therein and extending completely through the thickness of the flat portion 31.

Figure 2:
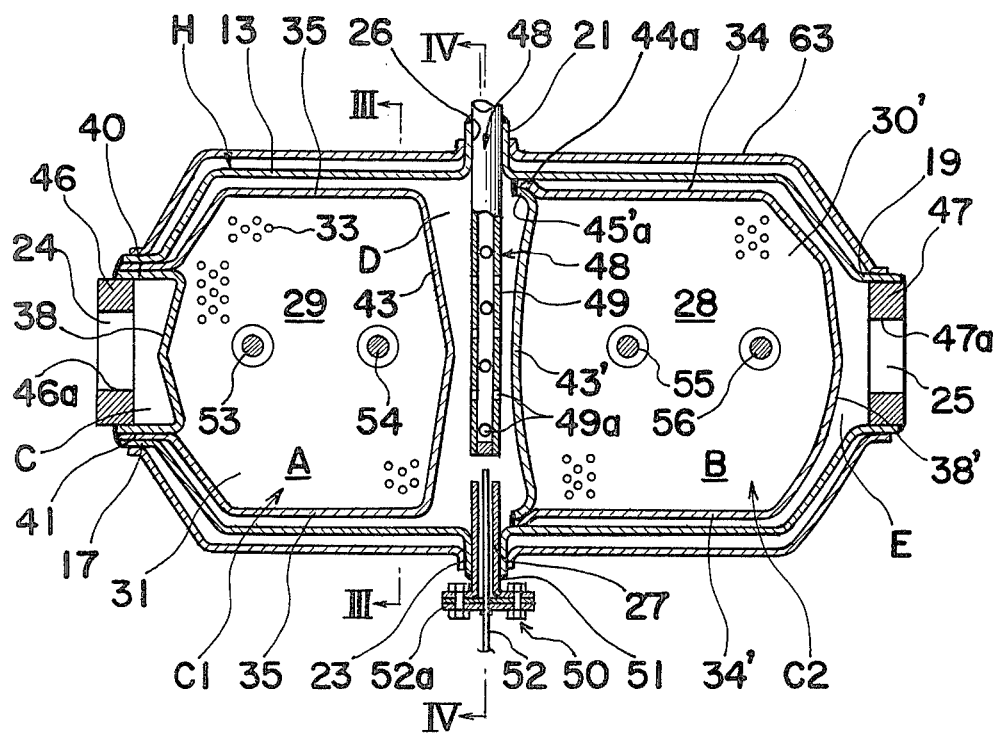
FIG. 2 is a cross sectional view taken along the line II—II in FIG. 1.

The first retainer plate 28 also includes gas impervious side walls 34 one on each side of the perforated flat portion 30 with mating side flanges 36 extending therefrom in a direction generally parallel to the plane of the flat portion 30, a gas impervious first end wall 38 with a concave, substantially semicylindrical flange 40 having its opposed sides contiguous to the respective side flanges 36, said first end wall 38 extending in one direction and inclined or flared outwardly of the container C1 with the semicylindrical flange 40 protruding therefrom in a direction parallel to the plane of the flat portion 30, and a gas impervious second end wall 42 with a mating end flange 44, said second end wall 42 extending in the direction opposite to the direction, in which the first end wall 38 extends, and inclined or flared outwardly of the container C1 with the mating end flange 44 protruding therefrom in a direction parallel to the plane of the flat portion 30. As best shown in FIG. 2, the width of the flat portion 30 of the first retainer plate 28 progressively decreases from the second end wall 42 towards the first end wall 38 in substantially complemental relation to a portion of the housing H adjacent the exhaust gas inlet 24.

Similarly, the second retainer plate 29 also includes gas impervious side walls 35 one on each side of the perforated flat portion 31 with mating side flanges 37 extending therefrom in a direction parallel to the plane of the flat portion 31, a gas impervious first end wall 39 with a concave, substantially semicylindrical flange 41 having its opposed sides contiguous to the respective side flanges 37, said first end wall 39 extending in one direction and inclined or flared outwardly of the container C1 with the semicylindrical flange 41 protruding therefrom in a direction parallel to the plane of the flat portion 31, and a gas impervious second end wall 43 extending in the direction opposite to the direction, in which the first end wall 37 extends, and inclined or flared outwardly of the container C1 with the mating flange 45 protruding therefrom in a direction parallel to the plane of the flat portion 31. The width of the flat portion 31 of the second retainer plate 29 progressively decreases from the second end wall 43 towards the first end wall 39 in substantially complemental relation to the flat portion 30 of the first retainer plate 28.

In view of the fact that the first and second catalyst containers C1 and C2 are so arranged as to assume a symmetrical relation to each other with respect to the center of symmetry lying on the imaginary line drawn in the widthwise direction of the housing H in coaxial relation with any one of the first and second bearing holes 26 and 27, as can understood from FIG. 1, the first and second retainer plates 28 and 29 of the first catalyst container C1 are respectively substantially identical with the first and second retainer plates 28' and 29' of the second catalyst container C2 and the first retainer plate 28 is positioned above the second retainer plate 29, but the first retainer plate 28' is positioned below the second retainer plate 29'.

Figure 3:
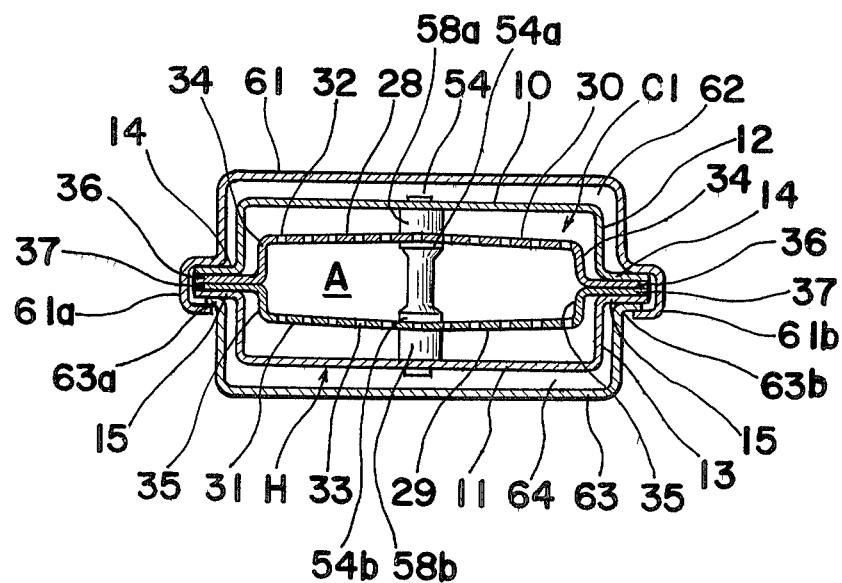
FIG. 3 is a cross sectional view taken along the line III—III in FIG. 2.

The first and second retainer plates 28 and 29 of the first catalyst container C1 are assembled together with the flanges of the first retainer plate 28 rigidly joined respectively to the mating flanges of the second retainer plate 29, in such a manner as will be described later, to provide a complete, sealed first catalyst container C1. Similarly, the first and second retainer plates 28' and 29' of the second catalyst container C2 are assembled together with the flanges of the first retainer plate 28' rigidly joined respectively to the mating flanges of the second retainer plate 29', in such a manner as will be described later, to provide a complete, sealed second catalyst container C2. The assembly of each of the first and second catalyst containers C1 and C2 should be carried out subsequent to the filling of the corresponding catalyst material in the container. Specifically, after the catalyst material has been filled, the outermost edges of the mating flanges of the first and second retainer plates 28 and 29 or 28' and 29' placed one above the other are welded together substantially as shown in FIG. 3.

These first and second catalyst containers C1 and C2 are so designed that, when assembled, respective retainer spaces A and B each being of a generally rhomboidal section when viewed in a direction perpendicular to the longitudinal axis of the housing H can be defined therein and that, when mounted within the housing H as best shown in FIG. 1 and in a manner as will be described later, an upstream chamber C, a generally S-shaped intermediate chamber D and a downstream chamber E can be defined respectively between the top housing shell 10 and the first retainer plate 28 of the container C1, between the second retainer plate 29 of the container C1 and the second retainer plate 29' of the container C2 and between the first retainer plate 28' of the container C2 and the bottom housing shell 11, said upstream chamber C and the S-shaped intermediate chamber D being communicated to each other through the retainer space A while the S-shaped intermediate chamber D and the downstream chamber E is communicated to each other through the retainer space B.

Preferably, the catalyst container C1 mounted within the housing H is so positioned that the distance of the first retainer plate 28 from the top housing shell 10 progressively decreases in a direction opposite to the inlet 24 while the flat portions 30 and 31 of the respective first and second retainer plates 28 and 29 are spaced a constant distance from each other, so as to form a progressively decreased cross-section for the incoming exhaust gas flow through the inlet 24. Similarly, the catalyst container C2 mounted within the housing H is so positioned that the distance of the second retainer plate 29' from the top housing shell 10 progressively decreases in a direction towards the outlet 25 while the flat portions 31' and 30' of the respective second and first retainer plates 29' and 28' are spaced a constant distance from each other, so as to form a progressively decreased cross-section for the exhaust gas flow directed towards the outlet 25 across the catalyst bed within the container C2.

Mounted within the inlet 24 and the outlet 25 are respective ring members 46 and 47 which have respective inlet and outlet passages 46a and 47a defined coaxially therein. The inlet ring member 46 is utilized to connect the inlet 24 of the housing H sealingly to an engine exhaust inlet pipe (not shown) leading from the internal combustion engine whereas the outlet ring member 47 is utilized to connect the outlet 25 of the housing H sealingly to an exhaust outlet pipe (not shown) leading to the atmosphere. Preferably, each of the ring members 46 and 47 is of a type having two or more connecting bolts secured thereto and extending outwardly therefrom for connection with the corresponding inlet or outlet pipe.

Figure 4:
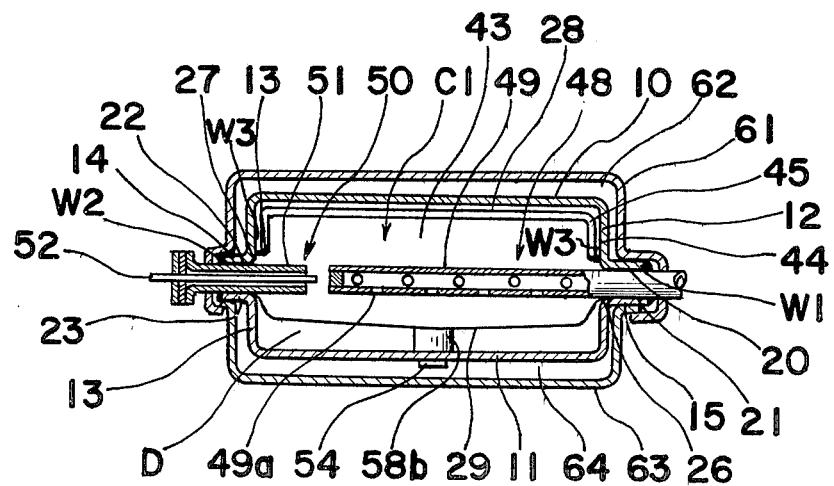
FIG. 4 is a cross sectional view taken along the line IV—IV in FIG. 2.
Figure 5:
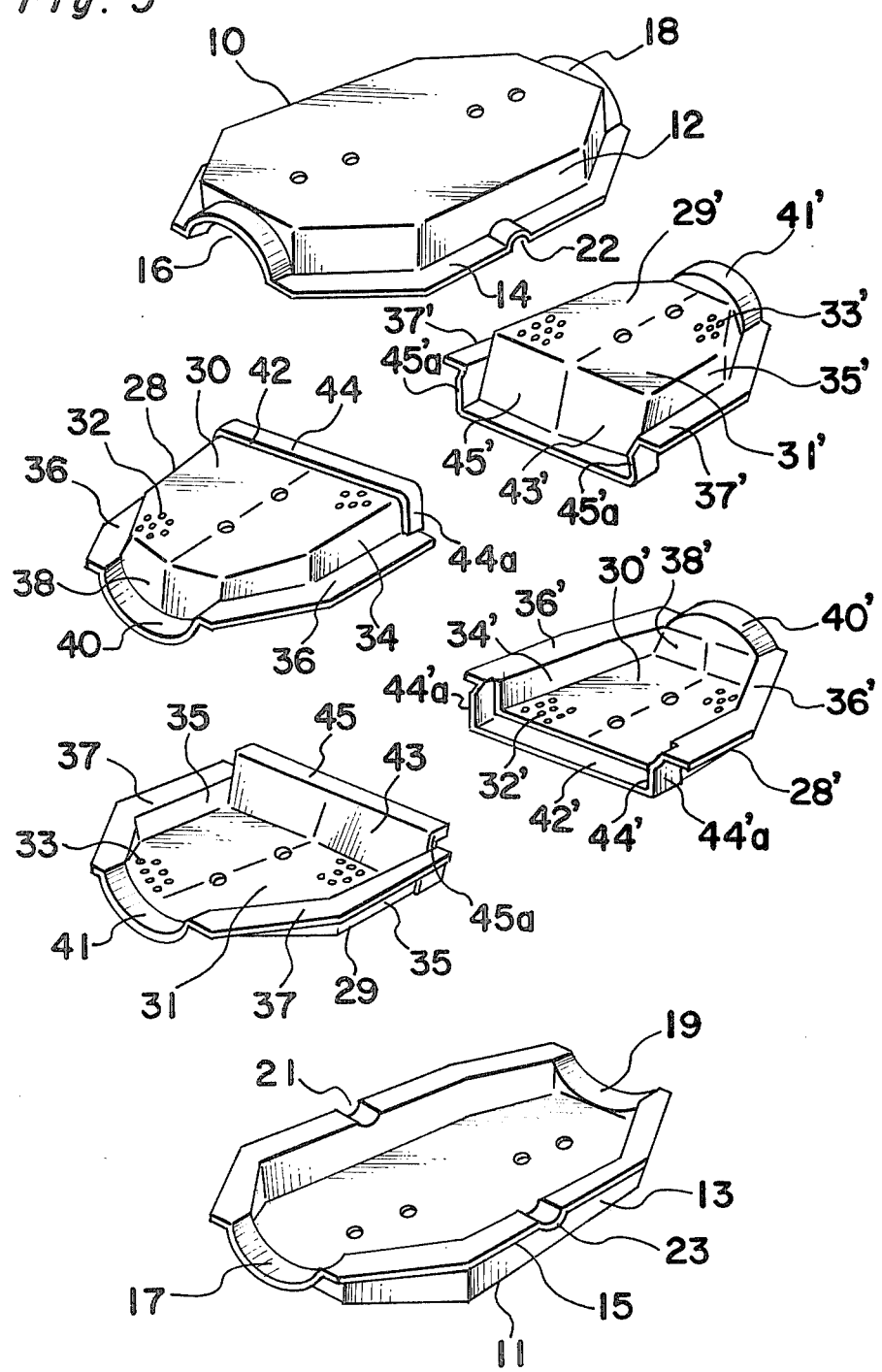
FIG. 5 is an exploded view of the catalytic converter embodying the present invention with top and bottom covers not illustrated.

The catalyst converter embodying the present invention further comprises an air supply nozzle 48 constituted by an elongated supply pipe 49 having one end adapted to be communicated to a source of secondary air and the other end situated within the substantially S-shaped intermediate chamber D between the first and second catalyst containers C1 and C2 and formed with a plurality of regularily or randomly arranged nozzle openings 49a. This supply pipe 49 is supported in position as protruding into the chamber D through the first bearing hole 26 with the outermost peripheral edges of the semicylindrical recesses 20 and 21 in the respective top and bottom housing shells 10 and 11 being welded as at W1 to the outer peripheral surface of the supply pipe 49 as best shown in FIG. 4. It is to be noted that the supply pipe 49 so projecting through the first bearing hole 26 into the chamber D extends in a direction perpendicular to the longitudinal axis of the converter housing H and in axial alignment with the longitudinal axis drawn between the first and second bearing holes 26 and 27.

Projecting into the chamber D through the second bearing hole 27 in alignment with the longitudinal axis of the supply pipe 49 is a substantially elongated temperature sensor assembly 50 including a protective sheath 51 and a sensor probe 52 extending through and inserted in the protective sheath 51. The protective sheath 51 has one end situated within the chamber D in alignment with the supply pipe 49 and the other end formed with a flange, a substantially intermediate portion of said protective sheath 51 extending through the second bearing hole 27 with the outermost peripheral edges of the semicylindrical recesses 22 and 23 in the respective top and bottom housing shells 10 and 11 being welded as at W2 to the outer peripheral surface of the protective sheath 51 as best shown in FIG. 4. The sensor probe 52 has a flange formed at 52a and is steadily supported in position within the protective sheath 51 with said flange 52a secured to the flange of the protective sheath 51 by means of a plurality of bolts and nuts in a manner as shown in FIG. 2.

The temperature sensor probe 52 is utilized to detect the temperature inside the catalyst converter so that the control of supply of the secondary air into the catalyst converter through the supply pipe 49 and/or the control of issuance of a warning signal can be effected depending upon the temperature actually detected thereby.

Referring particularly to FIGS. 1 to 3, for supporting each of the catalyst containers C1 and C2 steadily in position within the housing H, at least one or more support studs are employed. So far illustrated, two studs 53 and 54 or 55 and 56 are employed for each of the first and second catalyst containers C1 and C2. Each of the studs 53 to 56 is of a type having a pair of spaced shoulders 53a and 53b, 54a and 54b, 55a and 55b or 56a and 56b defined therein at respective positions spaced a distance inwardly from the opposed ends thereof. As best shown in FIG. 1, while the studs 53 and 54 are spaced from each other in a direction parallel to and, preferably, in alignment with the longitudinal axis of the converter housing H, each of the studs 53 and 54 extends through the top housing shell 10, the first retainer plate 28, the second retainer plate 29 and the bottom housing shell 11 with its opposed ends soldered to the respective top and bottom housing shells 10 and 11 while the first and second retainer plates 28 and 29 are urged to engage the respective shoulders 53a and 53b or 54a and 54b by means of spacers 57a and 57b or 58a and 58b mounted on the corresponding stud 53 or 54 and positioned between the top housing shell 10 and the first retainer plate 28 and between the bottom housing shell 11 and the second retainer plate 29, respectively.

Similarly, while the studs 55 and 56 are spaced from each other in a direction parallel to and, preferably, in alignment with the longitudinal axis of the converter housing H, each of the studs 55 and 56 extends through the top housing shell 10, the second retainer plate 29', the first retainer plate 28' and the bottom housing shell 11 with its opposed ends soldered to the respective top and bottom housing shells 10 and 11 while the first and second retainer plates 28' and 29' are urged to engage the respective shoulders 55b and 55a or 56b and 56a by means of spacers 59b and 59a or 60b and 60a mounted on the corresponding stud 55 or 56 and positioned between the bottom housing shell 11 and the first retainer plate 28' and between the top housing shell 10 and the second retainer plate 29', respectively.

The housing H is also provided with a top cover 61 above the top housing shell 10 with an adiabatic space 62 defined therebetween for preventing the converter from heat loss and for protecting the underbody of the vehicle from the heat of the converter. Similarly, the housing H is also provided with a bottom cover 63 below the bottom housing shell 11 with an adiabatic space 64 defined therebetween for preventing heat loss through the bottom of the converter.

In assemblying the catalyst converter according to the present invention, the peripheral flanges of the respective first and second retainer plates 28 and 29 of the first catalyst container C1 are joined together by means of a continuous peripheral weld to provide the complete and sealed container C1 whereas the peripheral flanges of the respective first and second retainer plates 28' and 29' of the second catalyst container C2 are joined together by means of a similarly continuous peripheral weld to provide the complete and sealed container C2. Within the housing H, the edge-sealed flanges flanges 36 and 37 of the first catalyst container C1 are, as best shown in FIG. 3, joined together with the peripheral flanges 14 and 15 of the respective top and bottom housing shells 10 and 11 by means of a continuous peripheral weld while the edge-sealed flanges 44 and 45 of the container C1 is welded to the top housing shell 10 and the edge-sealed, semicylindrical flanges 40 and 41 of the container C1 are welded to the outer peripheral surface of the inlet ring member 46 together with that portion of the flange of the bottom housing shell 11 where the semicylindrical passage 17 is defined. That portion of the flange of the top housing shell 10 where the semicylindrical passage 16 is defined is, as best shown in FIG. 1, welded to the outer peripheral surface of the inlet ring member 46 in opposed relation to the weld where the edge-sealed, semicylindrical flanges 40 and 41 are joined to the inlet ring member 46 together with that portion of the flange of the bottom housing shell 11.

Similarly, the edge-sealed flanges 36' and 37' of the second catalyst container C2 are, in a manner similar to that shown in FIG. 3, joined together with the peripheral flanges 14 and 15 of the respective top and bottom housing shells 10 and 11 by means of a continuous peripheral weld while the edge-sealed flanges 44' and 45' of the container C2 are welded to the bottom housing shell 11 and the edge-sealed, semicylindrical flanges 40' and 41' of the container C2 are welded to the outer peripheral surface of the outlet ring member 47 together with that portion of the flange of the top housing shell 10 where the semicylindrical passage 18 is defined. That portion of the flange of the bottom housing shell 11 where the semicylindrical passage 19 is defined is, as best shown in FIG. 1, welded to the outer peripheral surface of the outlet ring member 47 in opposed relation to the weld where the edge-sealed, semicylindrical flanges 40' and 41' are welded to the outer ring member 47 together with that portion of the flange of the top housing shell 11.

It is to be noted that the opposed side portions of the flange 44 which are contiguous to the respective side walls 34 of the first retainer plate 28 and which are respectively identified generally by 44a are welded to the corresponding opposed side portions of the flange 45 which are contiguous to the respective side walls 35 of the second retainer plate 29 and which are respectively identified generally by 45a. The edge-sealed side portions 44a and 45a of the flanges 44 and 45 of the respective first and second retainer plates 28 and 29 are in turn welded to the respective side walls 12 of the top housing shell 10 as at W3 shown in FIG. 4. Similarly, the opposed side portions of the flange 44' which are contiguous to the respective side walls 34' of the first retainer plate 28' and which are respectively identified generally by 44'a are welded to the corresponding opposed side portions of the flange 45' which are contiguous to the respective side walls 35' of the second retainer plate 29' and which are respectively identified generally by 45'a. The edge-sealed side portions 44'a and 45'a of the flanges 44' and 45' of the respective first and second retainer plates 28' and 29' are in turn welded to the respective side walls 13 of the bottom housing shell 11 in a manner similar to the weld W3.

By so doing, the first and second catalyst containers C1 and C2 can firmly be supported in position within the housing H.

It is also to be noted that the width of each of the flanges 14, 15, 36, 37, 36' and 37' is preferably so selected as to enable a substantially complete seal, when welded in the manner described above, sufficient to avoid any possible gas leakage, particularly, any possible leakage of exhaust gases flowing through the converter of the present invention.

Referring to FIGS. 3 and 4, the top cover 61 is joined to the housing H by means of substantially U-shaped joints 61a and 61b, one on each side of the converter, which are crimped about corresponding flanges 63a and 63b of the bottom cover 63, respectively. As best shown in FIG. 3, the four-layer sandwiches, each positioned on one side of the housing H and constituted by the edge-sealed flanges 14, 36, 37 and 15, are respectively clamped between the flanges 61a and 63a of the respective top and bottom covers 61 and 63 and between the flanges 61b and 63b of the respective top and bottom covers 61 and 63.

While the catalyst converter according to the present invention is constructed in the manner as hereinbefore described, it operates in the following manner. In describing the operation of the catalyst converter, it is assumed that the first and second catalyst containers C1 and C2 contain therein respective beds of reducing and oxidizing catalysts.

The exhaust gases emitted from the automobile internal combustion engine and introduced into the converter through the inlet 24 contain pollutants which are generally classified into an oxidizable group, such as noxious hydrocarbon (HC) and carbon monoxide (CO), and a reducible group such as oxides of nitrogen (NOx). Therefore, the reducing catalyst within the container C1 is selective for the reducible group of pollutant whereas the oxidizing catalyst within the container C2 is selective for the oxidizable group of pollutant.

The exhaust gases so introduced into the converter flow towards the outlet 25 successively past the upstream chamber C, then the retainer space A in the container C1, the intermediate chamber D, the retainer space B in the container C2 and finally the downstream chamber E in the order given above. More specifically, a stream of exhaust gases flowing through the inlet 24 is deflected towards the top housing shell 10, after having impinged upon the first end wall 38 of the first retainer plate 28 forming a part of the container C1, and then flows below the top housing shell 10 and above the flat portion 30 of the first retainer plate 28. The exhaust gas stream within the upstream chamber C enters the reducing catalyst bed within the container C1 through the apertures 32 and subsequently emerges from the container C1 through the apertures 33, flowing across the container C1 downwardly towards a portion of the intermediate chamber D below the second retainer plate 29 and above the bottom housing shell 11. The pollutants of the reducible group are thus removed from the exhaust gas stream during the flow across the reducing catalyst bed within the container C1.

The exhaust gas stream flowing into that portion of the intermediate chamber D flows generally diagonally upwards through another portion of the intermediate chamber D between the first and second containers C1 and C2 towards the top housing shell 10 and above the second retainer plate 29' forming a part of the container C2. During the diagonally upward flow of the exhaust gas stream through that portion of the intermediate chamber D between the first and second catalyst containers C1 and C2, the fresh secondary air is injected into the intermediate chamber D through the supply pipe 49 so that the oxidizing catalyst bed within the container C2 can operate in an oxidizing atmosphere. Therefore, during the subsequent flow of the exhaust gas stream across the oxidizing catalyst bed within the container C2 together with the fresh secondary air so injected, pollutants of the oxidizable group are removed from the exhaust gas stream.

The exhaust gases, which have substantially been purified and flowed into the downstream chamber E past the oxidizing catalyst bed within the container C2 are then discharged to the atmosphere through the outlet 25.

In the construction described above, since the supply pipe 49 and the temperature sensor assembly 50 project into the intermediate chamber D in axial alignment with each other through the first and second bearing holes 26 and 27, respectively, which are defined by the semicylindrical recesses 20 and 21 and the semicylindrical recesses 22 and 23, respectively, no boring technique is required and, therefore, the number of manufacturing steps can substantially be reduced and, yet, the converter of the present invention can readily and easily be assembled.

Furthermore, since the supply pipe 49 and the temperature sensor assembly 50 are positioned intermediately between the top and bottom housing shells 10 and 11, it is possible to employ the top and bottom housing shells 10 and 11 of identical construction and, therefore, the top and bottom housing shells 10 and 11 are interchangeable with each other. This means that production economies and reduced parts inventory can advantageously be achieved. Yet, since the first and second catalyst containers C1 and C2 are of identical construction having the respective retainer spaces A and B of the same volume, the both can also be interchangeable with each other thereby achieving the production economies and reduced parts inventory.

The following changes and modifications may be effected to the converter of the construction described above. In order to distribute the exhaust gases within the upstream chamber C and those within the intermediate chamber D uniformly over the respective tops of the first and second catalyst containers C1 and C2 so as to cause them to flow uniformly through the containers C1 and C2 without any possible bias in the flow of the exhaust gases, the first end wall 38 of the retainer plate 28 of the first catalyst container C1 and the second end wall 43' of the retainer plate 29' of the second catalyst container C2 are bent at their portions intermediate the width thereof to protrude outwardly of the respective first and second catalyst containers C1 and C2 in a direction towards the inlet 24 and, similarly, the second end wall 43 of the retainer plate 29 of the first catalyst container C1 and the first end wall 38' of the retainer plate 28' of the second catalyst container C2 are bent at their portions intermediate the width thereof to protrude outwardly of the respective first and second catalyst containers C1 and C2 in a direction towards the outlet 25, as best shown in FIG. 2.

In addition, although each of the portion 30 of the first retainer plate 28 of the container C1, the portion 31 of the second retainer plate 29 of the container C1, the portion 30' of the first retainer plate 28' of the container C2 and the portion 31' of the second retainer plate 29' of the container C2 has been described as flat, it may be curved in a widthwise direction thereof so that, when each of the first and second catalyst containers C1 and C2 has been assembled, the distance of the portion 30 or 31' to the top housing shell 10 and the distance of the portion 31 or 30' to the bottom housing shell 11 are maximum at either side of the corresponding catalyst container C1 or C2 and minimum at a position intermediate the width of the corresponding catalyst container C1 or C2. By so doing, a higher resistance can be applied to the flow of a portion of the exhaust gases intermediate the width of each of the containers C1 and C2 than to the flow of respective portions of the exhaust gases along the sides of each of the catalyst containers C1 and C2, thereby achieving the uniform flow of the exhaust gases in a direction parallel to the longitudinal axis of the converter.

The position of each of the support studs 53, 54, 55 and 56 may affect the pattern of flow of the exhaust gases within the housing H. In order to achieve a uniform pattern of flow of the exhaust gases within the housing H, it is preferred to position the support studs 53 to 56 in a row in alignment with the longitudinal axis of the housing H so that any possible converging flow of the exhaust gases which would undesirably concentrate at a local area can advantageously be avoided.

If the supply pipe 49 and the temperature sensor assembly 50 project into the intermediate chamber D in axially displaced relation to each other, not in axial alignment with each other, there will be the possibility that the pattern of low of the exhaust gases within the intermediate chamber D will be disturbed undesirably. This sometimes results in an inproper mixing of the exhaust gases with the fresh secondary air injected into the intermediate chamber D through the supply pipe 49. Therefore, as hereinbefore stated, it is preferred to support the supply pipe 49 and the temperature sensor assembly 50 in axially aligned relation to each other.

Referring now to FIG. 6(A) in which only one end portion of the first catalyst container C1 is illustrated, the flange 41 may not be welded to any one of the flange 40 and the inlet ring member 46. In other words, while the flanges 17 and 40 are welded together and are in turn welded to the inlet ring member 46, the flange 41 is sandwiched substantially loosely between the flanges 17 and 40 so that the alternate thermal expansion and contraction of the retainer plate 29 can be accommodated. Alternatively, both of the flanges 40 and 41 may be sandwiched substantially loosely between the inlet ring member 46 and the flange 17, such as shown in FIG. 6(B), so that the alternate thermal expansion and contraction of both of the retainer plates 28 and 29 can be accommodated.

It is to be noted that the alternative arrangement shown in any one of FIGS. 6(A) and 6(B) can equally be applicable to the like components at one end of the second catalyst converter C2 adjacent the outlet 25.

In addition, referring to FIG. 6(C) in which the opposite end portion of the first catalyst container C1 remote from the inlet 24 is illustrated, the flange 44 of the retainer plate 28 may not be welded to the top housing shell 10, but may be sandwiched substantially loosely between the flange 45 of the retainer plate 29 and the top housing shell 10 for a similar purpose. This arrangement shown in FIG. 6(C) can equally be applicable to the like components at the opposite end portion of the second catalyst converter C2 remote from the outlet 25.

Figure 6:
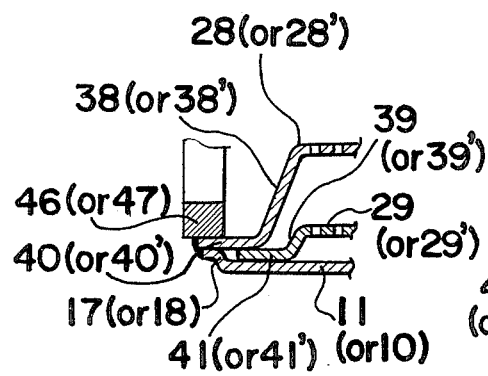
FIGS. 6(A) and 6(B) are longitudinal side sectional views, respectively, of one end portion of the catalytic converter, showing respective modifications of the manner of flanged connection of a catalyst container to both of a housing shell and a tubular coupling member.
FIG. 6(C) are a longitudinal side sectional view of one end portion of the catalyst container showing the manner of flanged connection to the housing shell.
Figure 6:
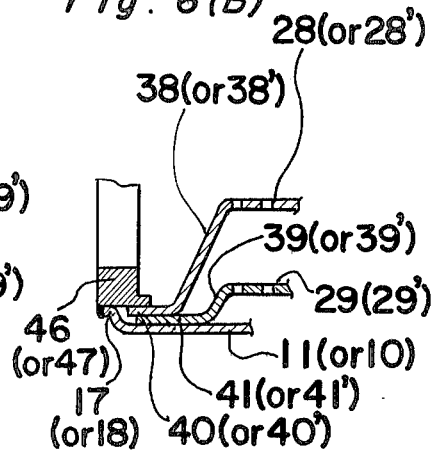
Figure 6:
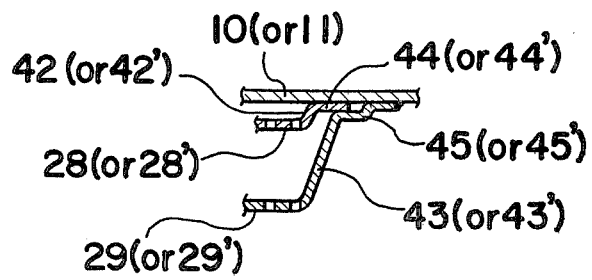
Figure 7:
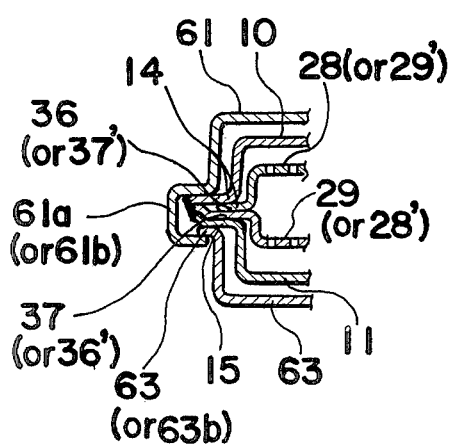
FIGS. 7(A) and 7(B) are cross sectional views, respectively, of one side portion of the catalytic converter showing respective modifications of flanged connection of the catalyst container to the housing structure.
Figure 7:
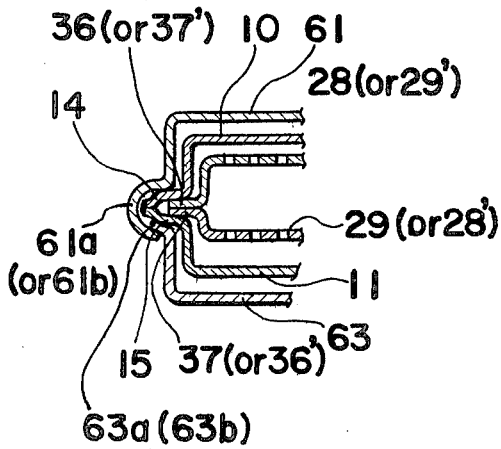

A similar loose connection as hereinabove described with particular reference to FIG. 6 can be employed to any one of the opposed sides of each of the first and second catalyst containers C1 and C2 such as shown in FIG. 7 for a similar purpose. Specifically, in FIG. 7(A), while the flanges 14, 37 or 36' and 15 are welded together, the flange 36 or 37' is sandwiched substantially loosely between the flanges 14 and 37 or 36'. In FIG. 7(B), while the flanges 14 and 15 are welded together, both of the flanges 36 and 37 or 37' and 36' are sandwiched substantially loosely between the flanges 14 and 15.

Although the present invention has fully been described in connection with the preferred embodiment thereof with reference to the accompanying drawings, it is to be noted that other changes and modifications, in addition to those described with reference to any one of FIGS. 6 and 7, are apparent to those skilled in the art without departing from the true scope of the present invention. By way of example, the catalyst containers C1 and C2 may contain the respective beds of the same catalyst material, such as the three-way catalyst operable in both of the reducing and oxidizing atmospheres, that is, capable of both oxidation and reduction. Where the three-way catalyst material is employed, no supply of the fresh secondary air through the supply pipe 49 is required.

In addition, although the first and second catalyst containers C1 and C2 have been described as having the respective retainer spaces A and B of the same volume, they may be of different volumes. By way of example, the first catalyst container C1 may be larger in volume than the second catalyst container C2 and, in this case, an oxidizing catalyst may be packed in the first catalyst container for cold start while either the three-way catalyst or the oxidizing catalyst may be packed in the second catalyst container for ordinary drive.

Each of the inlet and outlet ring members 46 and may be replaced with a connecting pipe. Alternatively, the inlet 24 and the outlet 25 of the converter embodying the present invention may receive and, therefore, be sealingly joined to the engine exhaust inlet pipe (which is generally referred to as an exhaust manifold) and the exhaust outlet pipe leading to the atmosphere, respectively.

Moreover, either one of the semicylindrical recesses 20 and 21 defined respectively in the flanges of the top and bottom housing shells 10 and 11 may not be always necessary.

Accordingly, these changes and modifications are to be understood as included within the true scope of the present invention unless they depart therefrom.

We claim:

1. A catalytic converter which comprises, in combination: a generally elongated housing structure including a generally upwardly dished top housing shell having a top peripheral flange protruding outwards therefrom, and a generally downwardly dished bottom housing shell having a bottom peripheral flange protruding outwards therefrom, said top and bottom housing shells being positioned one above the other, with the top and bottom peripheral flanges connected to each other, to define a gas flow compartment therein, said top housing shell also having first and second semicylindrical recesses opposed to each other and respectively defined at the opposed portions of the top peripheral flange, said bottom housing shell also having first and second semicylindrical recesses opposed to each other and respectively defined at the opposed portions of the bottom peripheral flange, said first and second semicylindrical recesses in the top peripheral flange and said first and second semicylindrical recesses in the bottom peripheral flange being so recessed upwardly and downwardly, respectively, as to define inlet and outlet openings at the opposed ends of the housing structure when the top and bottom housing shells are assembled together to define the gas flow compartment, first and second catalyst containers housed within the gas flow compartment adjacent the inlet and outlet openings, respectively, and spaced a distance from each other in a direction longitudinally of the housing structure, each of said first and second catalyst containers being adapted to hold a bed of catalyst material therein for removal of noxious pollutants from exhaust gases which may be introduced into the converter through the inlet opening and discharged therefrom through the outlet opening, said first and second catalyst containers so housed within the gas flow compartment dividing said gas flow compartment into an upstream chamber positioned between the inlet opening and the first catalyst container, a substantially intermediate chamber positioned between the first and second catalyst containers and a downstream chamber positioned between the second catalyst container and the outlet opening, each of said first and second catalyst containers being constituted by an upper retainer plate and a lower retainer plate, said upper retainer plate including a perforated top wall having a plurality of apertures defined therein, first and second side walls opposed to each other and having respective flanges remote from the perforated top wall of the upper retainer plate, and first and second end walls opposed to each other and having respective flanges remote from the perforated top wall of the upper retainer plate, said lower retainer plate including a perforated top wall having a plurality of apertures defined therein, first and second side walls opposed to each other and having respective flanges remote from the perforated top wall of the lower retainer plate, and first and second end walls opposed to each other and having respective flanges remote from the perforated top wall of the lower retainer plate, said upper and lower retainer plates for each of the first and second catalyst containers being positioned one above the other with the flanges of said side and end walls of the respective upper and lower retainer plates, thereby defining a catalyst retainer space for the accommodation of the corresponding catalyst bed, said upstream chamber being communicated to the intermediate chamber through the catalyst bed within the first catalyst container and said downstream chamber being also communicated to the intermediate chamber through the catalyst bed within the second catalyst container, the overlapped opposed side walls of the respective upper and lower retainer plates for each of the first and second catalyst containers being sandwiched between other respective portions of the top and bottom peripheral flanges than said opposed portions where the semicylindrical recesses are defined, respectively, inlet and outlet tubular members respectively inserted in the inlet and outlet openings, the first end walls of the upper and lower retainer plates of the first catalyst container being sandwiched in position between the outer peripheral surface of the inlet tubular member and that portion of the flange of the bottom housing shell where the first semicylindrical recess is defined whereas the second end walls of the upper and lower retainer plates of the second catalyst container are sandwiched in position between the outer peripheral surface of the outlet tubular member and that portion of the flange of the top housing shell where the second semicylindrical recess is defined, the second end walls of the upper and lower retainer plates of the first catalyst container being secured to the top housing shell whereas the first end walls of the upper and lower retainer plates of the second catalyst container are secured to the bottom housing shell, and a substantially elongated nozzle means protruding through the joint between the flanges of the top and bottom housing shells into the intermediate chamber in a direction generally perpendicular to the longitudinal axis of the housing structure, said nozzle means being utilized to inject a secondary air therethrough into the intermediate chamber to mix with the exhaust gases flowing therein.

2. A catalytic converter as claimed in claim 1, wherein a portion of the flange of at least one of the top and bottom housing shells, which is located on one side of the housing structure, is formed with a first concave portion complemental in cross sectional shape to the nozzle means, said nozzle means sealingly extending through said concave portion and secured to that portion of the flange of the housing shell on one side of the housing structure.

3. A catalyst converter as claimed in claim 1, wherein that portion of the flange of the bottom housing shell where the first semicylindrical recess is defined and the first end wall of the upper retainer plate of the first catalyst container are welded to the outer peripheral surface of the inlet tubular member while the first end wall of the lower retainer plate of the first catalyst container is loosely sandwiched between the first end wall of the upper retainer plate of the first catalyst container and that portion of the flange of the bottom housing shell where the first semicylindrical recess is defined.

4. A catalyst converter as claimed in claim 1, wherein that portion of the flange of the bottom housing shell where the first semicylindrical recess is defined is welded to the outer peripheral surface of the inlet tubular member while the first end walls of the upper and lower retainer plates of the first catalyst container is loosely sandwiched between the inlet tubular member and that portion of the flange jof the bottom housing shell where the first semicylindrical recess is defined.

5. A catalytic converter as claimed in claim 1, further comprising at least one supporting stud for each of the first and second catalyst containers, said supporting stud extending between the top and bottom housing shells through the corresponding catalyst container to keep the upper and lower retainer plates of said corresponding catalyst container in constantly spaced relation to each other.

6. A catalytic converter as claimed in claim 5, wherein said supporting stud has a pair of opposed end portions reduced in diameter relative to the substantially intermediate portion thereof, said intermediate portion of the supporting stud being positioned between the upper and lower retainer plates, the extremities of said respective end portions of the supporting stud being rigidly connected to the top and bottom housing shells, respectively.

7. A catalytic converter as claimed in claim 6, further comprising a pair of spacer members for each supporting stud, said spacer members being mounted on the reduced end portions of the supporting stud and positioned between the top housing shell and the upper retainer plate and between the bottom housing shell and the lower retainer plate, respectively.

8. A catalytic converter as claimed in claim 1, further comprising a substantially elongated temperature sensor projecting into the intermediate chamber in axial alignment with the nozzle means for detecting the temperature inside the converter.

* * * * *